(12) United States Patent
Miyawaki et al.

(10) Patent No.: US 8,377,563 B2
(45) Date of Patent: *Feb. 19, 2013

(54) PAPERMAKING ADDITIVE AND PAPER CONTAINING THE SAME

(75) Inventors: Shoichi Miyawaki, Tokyo (JP); Shiho Katsukawa, Tokyo (JP); Hiroshi Abe, Tokyo (JP); Yuko Iijima, Tokyo (JP); Akira Isogai, Tokyo (JP)

(73) Assignee: Nippon Paper Industruies Co., Ltd., Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 12/922,546

(22) PCT Filed: Mar. 25, 2009

(86) PCT No.: PCT/JP2009/055967
§ 371 (c)(1),
(2), (4) Date: Sep. 14, 2010

(87) PCT Pub. No.: WO2009/122982
PCT Pub. Date: Oct. 8, 2009

(65) Prior Publication Data
US 2011/0008638 A1 Jan. 13, 2011

(30) Foreign Application Priority Data
Mar. 31, 2008 (JP) .................... 2008-091333

(51) Int. Cl.
*B32B 23/04* (2006.01)

(52) U.S. Cl. ............ 428/532; 428/535; 428/537.5; 427/324; 427/411

(58) Field of Classification Search .............. 428/532, 428/537.5, 535; 427/324, 411
See application file for complete search history.

(56) References Cited

U.S. PATENT DOCUMENTS

| | | | |
|---|---|---|---|
| 6,524,348 B1 * | 2/2003 | Jewell et al. | 8/116.1 |
| 2005/0067730 A1 | 3/2005 | Yano et al. | |
| 2007/0207692 A1 | 9/2007 | Ono et al. | |

FOREIGN PATENT DOCUMENTS

| | | | |
|---|---|---|---|
| EP | 2 184 299 | | 5/2010 |
| JP | 02-006682 | | 1/1990 |
| JP | 07-102073 | A | 4/1995 |
| JP | 2001-247812 | A | 9/2001 |
| JP | 2002-322313 | * | 11/2002 |
| JP | 2002-348522 | | 12/2002 |
| JP | 2003-049390 | | 2/2003 |
| JP | 2003-180812 | A | 7/2003 |
| JP | 2003-201695 | | 7/2003 |
| JP | 2004-300624 | | 10/2004 |
| JP | 2004-332140 | A | 11/2004 |
| JP | 2006-008857 | A | 1/2006 |
| JP | 2007/204716 | A | 8/2007 |
| JP | 2008-1728 | * | 1/2008 |
| JP | 2008-001728 | | 1/2008 |
| JP | 2008-308802 | | 12/2008 |
| WO | WO 2006/004012 | | 1/2006 |
| WO | 2009/020239 | | 2/2009 |

OTHER PUBLICATIONS

Saito et al, "Preparation of Cellulose single Microfibrils . . . " Cellulose Commun. vol. 14, No. 2 (2007) pp. 62-66.*
International Search Report for PCT/JP2009/055967, mailed May 12, 2009.
Tsuguyuki Saito et al., "Preparation of Cellulose Single Microbibrils from Native Cellulose by Tempo-Mediated oxidation", Cellulose Commun. vol. 14, No. 2, (2007), pp. 62-66.
Tsuguyuki Saito et al., "Homogeneous Suspensions of Individualized Microfibrils from TEMPO-Catalyzed Oxidation of Native Cellulose", Biomacromolecules, 2006, 7 (6), pp. 1687-1691.
Tsuguyuki Saito et al., "Cellulose Nanofibers Prepared by TEMPO-Mediated Oxidation of Native Cellulose", Biomacromolecules, 2007, 8 (8), pp. 2485-2491.

* cited by examiner

*Primary Examiner* — Leszek Kiliman
(74) *Attorney, Agent, or Firm* — Nixon & Vanderhye P.C.

(57) ABSTRACT

A papermaking additive comprising cellulose nanofibers whose aqueous solution at a concentration of 2% (w/v) has a B-type viscosity (60 rpm, 20° C.) of 500 to 7000 mPa·s, preferably 500 to 2000 mPa·s is used to prepare a paper having improved air resistance and smoothness. This additive is prepared by oxidizing a cellulosic material with an oxidizing agent in the presence of (1) N-oxyl compound(s) and (2) bromide, iodide or a mixture thereof to prepare oxidized cellulose, and finely grinding the oxidized cellulose in a wet condition to convert the oxidized cellulose into nanofibers.

22 Claims, 5 Drawing Sheets

PAPERMAKING ADDITIVE AND PAPER CONTAINING THE SAME

This application is the U.S. national phase of International Application No. PCT/JP2009/055967, filed 25 Mar. 2009, which designated the U.S. and claims priority to Japanese Patent Application No. 2008-091333, filed 31 Mar. 2008, the entire contents of each of which are hereby incorporated by reference.

TECHNICAL FIELD

This invention relates to a papermaking additive comprising cellulose nanofibers having a B-type viscosity (60 rpm, 20° C.) of 500 to 7000 mPa·s, preferably 500 to 2000 mPa·s at a concentration of 2%; and paper containing the papermaking additive. More specifically, the invention relates to paper containing the above papermaking additive capable of improving air resistance and smoothness, the paper which is used as printing paper, news printing paper, electrophotographic transfer paper, inkjet recording paper, thermal recording paper, pressure sensitive recording paper, converting paper, paperboard, sanitary paper, or base paper for coated paper or laminated paper.

BACKGROUND ART

Paper has voids, and the voids penetrating the paper in its thickness direction, in particular, influence barrier properties against oxygen and steam, or permeability to a coating material. Patent Literature 1 discloses use of a carboxymethylcellulose sodium salt having a degree of carboxymethyl substitution of 0.25 to 0.5 and a viscosity of 5 to 300 mPa·s as an aqueous solution at a concentration of 1%, as a permeation suppressant suppressing permeation of a paint through base paper. As a method for improving the air resistance which is an indicator of voids in paper, Patent Literature 2 discloses base paper for release paper incorporating ungelatinized granular starch. Patent Literature 3 discloses an improver for paper surface quality comprising an anionic polyacrylamide resin.
Patent Document 1: JP 2004-300624 A
Patent Document 2: JP 1992-57798 B
Patent Document 3: JP 2003-49390 A

SUMMARY OF THE INVENTION

Problems to be Solved by the Invention

However, By using the above-mentioned carboxymethylcellulose, ungelatinized granular starch, and anionic polyacrylamide resin, it is difficult to form a coating film which completely fills in the voids of paper, and a paper having sufficient air resistance has not been obtained. Other methods for improving air resistance by strengthening the beating of pulp for improving bonds between fibers, or by collapsing the voids by strong calendaring, increase the density of paper, and the resulting paper is difficult to be applied other than special uses.

It is an object of the present invention to provide a papermaking additive capable of improving air resistance of paper markedly, and paper containing the additive, specifically, printing paper, news printing paper, electrophotographic transfer paper, inkjet recording paper, thermal recording paper, pressure sensitive recording paper, converting paper, paperboard, or sanitary paper; and coated paper, inkjet recording paper, thermal recording paper, pressure sensitive recording paper, converting paper, or laminated paper which uses the paper markedly improved in air resistance as base paper.

Means for Solving the Problems

The inventors of the present invention have found that cellulose nanofiber having a suitable B-type viscosity (60 rpm, 20° C.) of 500 to 7000 mPa·s, preferably, 500 to 2000 mPa·s at a concentration of 2% as an aqueous dispersion, and showing moderate consistency which enables the nanofibers to be applied to a base such as paper, can be obtained by oxidizing cellulosic material with the addition of an oxidizing agent in the presence of (1) N-oxyl compound(s), and (2) compound(s) selected from bromide, iodide, or mixtures thereof, and then finely grinding the oxidized cellulosic material by a wet process to defibrate the fibers in a specific manner. The inventors also have found that incorporating a papermaking additive comprising the cellulose nanofiber into paper can improve air resistance of paper, without an increase in density of paper.

Effects of the Invention

The papermaking additive containing cellulose nanofibers according to the present invention can remarkably increase air resistance of paper, as compared to starch and polyacrylamide, and using the papermaking additive of the present invention can produce a high-quality paper having high air resistance.

DESCRIPTION OF EMBODIMENTS (Cellulose Nanofiber)

Figure 1:
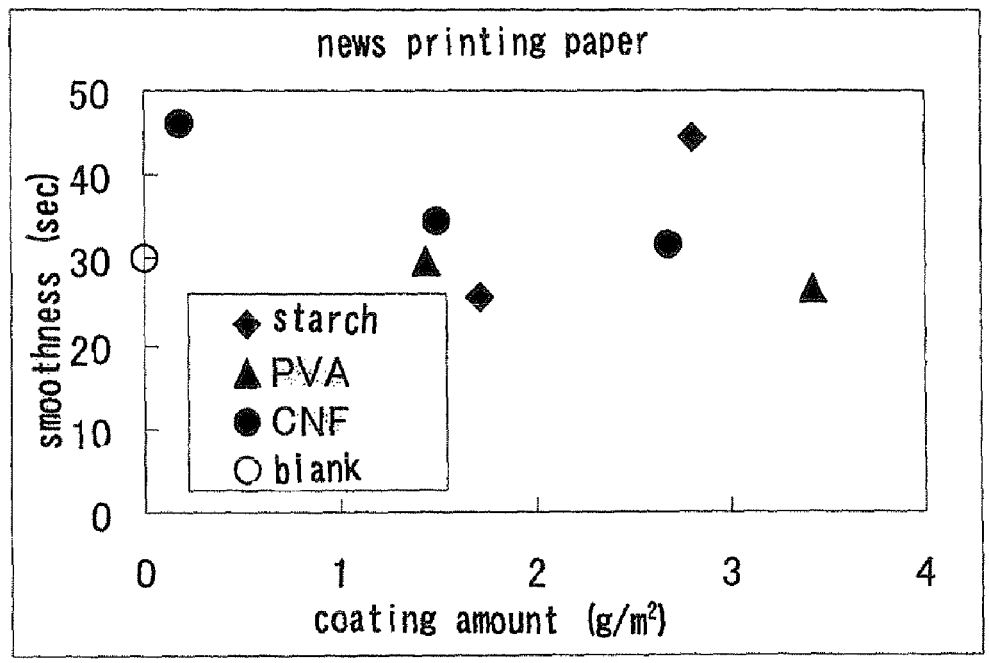
FIG. 1 is a graph showing the results of measurements of the smoothnesses of news printing papers prepared in Example 2 (CNF), Comparative Example 4 (blank), Comparative Example 5 (starch), and Comparative Example 6 (PVA).

The papermaking additive of the present invention comprises cellulose nanofibers. Cellulose nanofibers are single cellulose microfibril having a width of 2 to 5 nm and a length of 1 to 5 μm, which are obtained by defibrating fibers in cellulosic material. The present invention uses, in particular, an aqueous dispersion of cellulose nanofibers having a B-type viscosity (60 rpm, 20° C.) of 500 to 7000 mPa·s, preferably 500 to 2000 mPa·s at a concentration of 2% (w/v) (that is, 2 g of cellulose nanofiber (dry weight) is contained in 100 ml of dispersion). The papermaking additive of the present invention shows moderate consistency, and can be easily prepared to a coating material by merely adjusting its concentration to a desired level. Comparatively low value of B-type viscosity of cellulose nanofibers as a 2% (w/v) aqueous dispersion is preferred since such low-viscosity nanofibers can be easily prepared to a coating material. The viscosity is preferably about 500 to 2000 MPa·s, more preferably about 500 to 1500 MPa·s, and most preferably about 500 to 1000 MPa·s.

The B-type viscosity of the cellulose nanofiber of the present invention may be measured by a known method. For example, a viscometer, VISCOMETER TV-10, available from TOKI SANGYO Corporation can be used to measure the B-type viscosity.

The cellulose nanofiber having a B-type viscosity (60 rpm, 20° C.) of 500 to 7000 mPa·s, preferably 500 to 2000 mPa·s as a 2% (w/v) aqueous solution, can be obtained, for example, by oxidizing a cellulosic material with the addition of an oxidizing agent in the presence of (1) N-oxyl compound(s), and (2) compound(s) selected from bromide, iodide or mixtures thereof; and then finely grinding the oxidized cellulose by a wet process to defibrate fibers in the cellulose and convert the cellulose into nanofibers.

The cellulosic material used in the present invention is not limited, and includes kraft pulp or sulfite pulp of various wood origins, powdery cellulose formed by pulverizing such pulp by a high pressure homogenizer, a mill or the like, and a microcrystalline cellulose powder formed by purifying such a material by chemical treatment such as acid hydrolysis. Among them, bleached kraft pulp, bleached sulfite pulp, powdery cellulose, and a microcrystalline cellulose powder are preferably used since comparatively low-viscosity cellulose nanofibers whose B-type viscosity is about 500 to 2000 MPa·s in an aqueous dispersion at a concentration of 2% (w/v) can be prepared effectively by using these materials. More preferably, powdery cellulose and a microcrystalline cellulose powder are used.

Powdery cellulose is a rod-like particle of microcrystalline cellulose which is obtained by removing amorphous parts from wood pulp with an acid hydrolysis treatment, and pulverizing and sieving it. In the powdery cellulose, degree of polymerization of cellulose is preferably about 100 to 500, crystallinity of powdery cellulose measured by X-ray diffraction is preferably about 70 to 90%, a mean volume diameter measured by laser diffraction is preferably not more than 100 μm, more preferably not more than 50 μm. By using powdery cellulose having a mean volume diameter of not less than 100 μm, a highly-fluid dispersion of cellulose nanofibers can be prepared. As the powdery cellulose used in the present invention, for example, a rod-like crystalline cellulose powder having a certain particle size distribution which is obtained by a method comprising subjecting a selected pulp to an acid hydrolysis treatment to obtain an undecomposed residue, and purifying, drying, pulverizing and sieving the residue, may be used, or a commercially available powdery cellulose such as KC FLOCK® available from NIPPON PAPER CHEMICALS Corporation, CEOLUS® available from ASAHI KASEI CHEMICALS Corporation, and AVICEL® available from FMC Corporation may also be used.

As the N-oxyl compound used in the present invention, any compounds which can promote desired oxidizing reaction may be used. For example, the N-oxyl compound used in the invention includes the compound represented by the following formula (1):

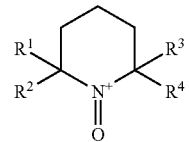

formula 1 wherein $R^1$ to $R^4$ are identical or different from each other, an alkyl group having about 1 to 4 carbon atoms.

Among the compounds represented by the formula (1), compounds which produce 2,2,6,6-tetramethyl-1-piperidin-N-oxyradical (hereinafter referred to as TEMPO) and a 4-hydroxy-2,2,6,6-tetramethyl-1-piperidin-N-oxyradical (hereinafter referred to as 4-hydroxy TEMPO) are preferred. In particular, derivative of 4-hydroxy TEMPO is most preferably used. As the derivatives of 4-hydroxy TEMPO, derivatives in which the hydroxyl group of 4-hydroxy TEMPO has been etherified with an alcohol containing a straight or branched carbon chain having 4 or less carbon atoms, or esterified with a carboxylic acid or a sulfonic acid, are preferably used. When etherifying 4-hydroxy TEMPO, a water-soluble derivative can be obtained by using an alcohol having 4 or less carbon atoms, regardless of the presence or absence of a saturated or unsaturated bond, and the water-soluble derivative of 4-hydroxy TEMPO can function effectively as an oxidation catalyst.

The derivatives of 4-hydroxy TEMPO include, for example, compounds represented by the following formulas 2 to 4:

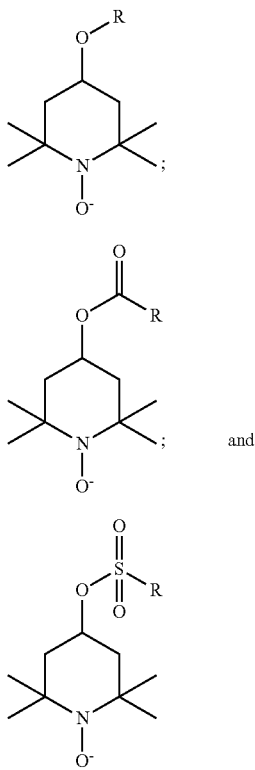

formula 2 formula 3 and formula 4 wherein R is a straight or branched carbon chain having 4 or less carbon atoms.

Further, a radical of the N-oxyl compound represented by the following formula 5:

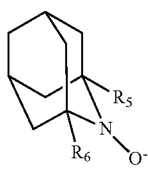

formula 5 wherein $R^5$ and $R^6$ are identical or different from each other, hydrogen, or a C1 to C6 straight or branched alkyl group, that is, aza-adamantane type nitroxy radical can be used preferably, since such compounds can shorten reaction time, and promote to produce a uniform cellulose nanofiber.

The amount of the N-oxyl compounds such as TEMPO and 4-hydroxy TEMPO derivatives used in the oxidization of cellulosic material is not limited, as long as it is a catalytic amount which enables the cellulosic material to be converted into nanofibers. For example, its amount is of the order of 0.01 to 10 mmols, preferably 0.01 to 1 mmol, more preferably 0.05 to 0.5 mmol, based on 1 g (absolute dry weight) of the cellulosic material.

As the bromide or iodide used in the oxidization of cellulosic material, a compound which can dissociate in water and ionize, for example, an alkali metal bromide, an alkali metal iodide or the like can be used. The amount of the bromide or iodide used can be selected within a range which can promote the oxidation reaction. For example, the amount is of the order of 0.1 to 100 mmols, preferably 0.1 to 10 mmols, more preferably 0.5 to 5 mmols, based on 1 g (absolute dry weight) of the cellulosic material.

As the oxidizing agent used in the oxidization of cellulosic material, any oxidizing agent can be used, as long as it can proceed with the intended oxidation reaction, such as a halogen, a hypohalogenous acid, a halogenous acid, a perhalogenic acid, or a salt thereof, a halogen oxide, or a peroxide. From the viewpoint of the manufacturing cost, the preferred oxidizing agent to be used is sodium hypochlorite which is used currently most widely in industrial processes, which is inexpensive, and which imposes a minimal environmental load. The amount of the oxidizing agent used can be selected within a range which can promote the oxidation reaction. For example, the amount is of the order of 0.5 to 500 mmols, preferably 0.5 to 50 mmols, more preferably 2.5 to 25 mmols, based on 1 g (absolute dry weight) of the cellulosic material.

Oxidization of cellulosic material in the present invention is characterized that the oxidization of the cellulosic material is carried out in water with the addition of an oxidizing agent such as sodium hypochlorite in the presence of (1) N-oxyl compound(s) such as 4-hydroxy TEMPO derivative(s) and (2) compound (s) selected from the group consisting of bromide, iodide and mixtures thereof. The method has the feature that it can proceed with the oxidation reaction smoothly even under mild conditions. Thus, the reaction temperature may be room temperature of the order of 15 to 30° C. As the reaction proceeds, carboxyl groups form in the cellulose, and a decline in the pH of the reaction mixture is observed. To proceed with the oxidation reaction efficiently, it is desirable to maintain the pH of the reaction mixture at a value of 9 to 12, preferably about 10 to 11 with the addition of alkaline solution such as an aqueous solution of sodium hydroxide.

Cellulose nanofibers can be produced by finely grinding the oxidized cellulosic material which has been obtained by oxidizing cellulosic material in the presence of (1) N-oxyl compound(s) and (2) compounds selected from bromide, iodide or mixtures thereof, with the addition of an oxidizing agent, in a wet condition to defibrate it. In the wet fine grinding, mixing/stirring, emulsifying/dispersing devices, such as a high-speed shearing mixture and a high-pressure homogenizer can be used alone or in combination. In particular, an ultrahigh-pressure homogenizer which can force not less than 100 MPa, preferably not less than 120 MPa, more preferably not less than 140 MPa is preferably used in the wet fine grinding, since such a ultrahigh-pressure homogenizer can produce cellulose nanofibers having a comparatively low viscosity such as a B-type viscosity of 500 to 2000 mPa·s in an aqueous dispersion of 2% (w/v), effectively.

The cellulose nanofibers of the present invention desirably has an amount of the carboxyl groups being 0.5 mmol/g or more, preferably 0.9 mmol/g, more preferably 1.2 mmol/g, based on 1 g (absolute dry weight) of cellulose nanofibers. Such cellulose nanofibers can promote preparation of uniform dispersion. The amount of cellulose nanofibers can be measured by preparing 60 ml of slurry containing 0.5 weight % of cellulose nanofiber, adding 0.1M of hydrochloric acid to adjust the slurry's pH at 2.5, dropping 0.05N of aqueous sodium hydroxide with measuring electrical conductivity until the pH reaches 11, and determining an amount of sodium hydroxide (a) which is consumed in neutralization of weak acid when the electrical conductivity shows gentle curve, and using the following formula:

Amount of carboxyl groups(mmol/g pulp)=$a$(ml)× 0.05/weight of oxidized pulp(g).

(Paper which Contains Cellulose Nanofibers)

Incorporating the papermaking additive comprising cellulose nanofiber of the present invention into paper can improve air resistance of the paper, and can impart functions such as the suppression of permeation of a coated material, and an improvement in barrier properties. Also, when paper is coated with or impregnated with the papermaking additive of the present invention, the smoothness of the paper can be improved, thus enhancing printability. A paper prepared by coating or impregnating the papermaking additive of the cellulose nanofibers of the present invention is excellent in barrier properties and heat resistance and can be used as a packaging material.

A papermaking additive comprising the cellulose nanofibers of the present invention may be internally added or externally added to paper. However, its external addition is desirable because the external addition enables the cellulose nanofibers to be present in a larger amount in the vicinity of the paper surface and can highly improve air resistance and smoothness. In externally adding the papermaking additive, it is recommendable to coat an aqueous dispersion of the cellulose nanofibers on paper by a coating machine such as a 2-roll size press coater, a gate roll coater, a blade metering coater, or a rod metering coater, or impregnate paper with the nanofibers.

The preferred content of the papermaking additive according to the present invention is 0.1 to 10% by weight based on the dry weight of cellulose nanofibers in the dry weight of paper and, in the case of external addition, is 0.01 to 10 $g/m^2$, preferably 0.1 to 10 $g/m^2$, as the amount of coating per surface. In the case of external addition of the papermaking additive of the present invention onto a printing paper such as a news printing paper, the preferred content of the additive is 0.1 to 5 $g/m^2$ as the amount of coating per surface; in the case of external addition onto a converting paper such as base paper for wallpaper, the preferred content is 1 to 5 $g/m^2$, more preferably 2 to 5 $g/m^2$; and in the case of external addition onto base paper for a coated paper, the preferred content is 1 to 5 $g/m^2$, more preferably 2 to 5 $g/m^2$.

Paper containing the cellulose nanofibers according to the present invention is produced by a known paper machine, and its paper making conditions are not regulated. As the paper machine, a Fourdrinier paper machine, a twin wire paper machine, or the like is used. Also, a cylinder paper machine can be used to produce multi-layer paper or a paperboard.

The paper of the present invention may be not only paper in a single layer, but also multi-layer paper in two or more layers, or a paperboard. In the multi-layer paper, the cellulose nanofibers may be contained in at least one of the layers.

The paper of the present invention uses, as a pulp component, chemical pulp (needle bleached kraft pulp (NBKP) or needle unbleached kraft pulp (NUKP), leaf bleached kraft pulp (LBKP) or leaf unbleached kraft pulp (LUKP), etc.), mechanical pulp (ground pulp (GP), thermomechanical pulp (TMP), chemithermomechanical pulp (CTMP), etc.), or recycled pulp such as deinked pulp (DIP), any of these pulps being used alone or as mixed in arbitrary proportions. During papermaking, pH may be acidic, neutral, or alkaline.

The paper of the present invention may also contain one or more filler(s). As the filler, a publicly known filler can be used, such as white carbon, talc, kaolin, clay, heavy calcium carbonate, light calcium carbonate, titanium oxide, or a synthetic resin filler. Among them, in view of protection of the environment, and improvement of preservation quality of paper, calcium carbonate is preferably used to carry out neutral papermaking, so as to make the pH of the surface of paper being 6 to 9.

Further, the paper of the present invention may, if necessary, contain aluminum sulfate, a sizing agent, a paper strength agent, a retention aid, a drainage aid, a coloring agent, a dyestuff, an anti-foaming agent, and a bulking agent.

(Printing Paper)

The paper of the present invention which contains cellulose nanofibers can be used as printing paper upon coating with a surface treating agent containing no pigment. Desirably, a surface treating agent consisting essentially of a water-soluble polymer, in order to improve surface strength and sizing properties. Alternatively, if a water-soluble polymer is used, the polymer may be mixed with the papermaking additive consisting of the cellulose nanofibers of the present invention, and coated therewith. When the papermaking additive is mixed with a water-soluble polymer and coated or impregnated, as compared to the case where the water-soluble polymer is used alone, a paper having high smoothness and air resistance, as well as showing high adherability of ink and low print-through in offset printing, can be obtained.

As the water-soluble polymer, a surface treating agent in common use can be used, such as starch including a starch, oxidized starch, and processed starch, carboxymethylcellulose, polyacrylamide, or polyvinyl alcohol, any of these surface treating agents being used alone or as a mixture. To the surface treating agent, in addition to the water-soluble polymer, it is possible to add a paper strength agent which can enhance water resistance and surface strength, or to externally add a sizing agent which can enhance sizing properties. If neutral papermaking is carried out, it is preferred that a cationic surface sizing agent is externally added.

The mixed ratio of the water-soluble polymer to the papermaking additive comprising cellulose nanofibers is not in particular limited, but it is preferred that the content of water-soluble polymer is 80 to 98 wt % and the content of the papermaking additive is 2 to 20 wt %, based on the solid content of the surface treating agent in the coating liquid. If the content of the papermaking additive is too high, viscosity of the coating liquid increases and the coating abilities of the coating liquid decrease.

The surface treating agent can be coated by a coating machine, such as a 2-roll size press coater, a gate roll coater, a blade metering coater, or a rod metering coater. Of them, a film transfer type coating machine such as a gate roll coater is preferred as compared to an impregnating type coating machine such as a 2-roll size press coater, because the surface treating agent remains on the paper surface more and proves effective even in a smaller amount of coating. The preferred amount of coating with the surface treating agent is, based on dry weight, 0.05 $g/m^2$ or more, but 3 $g/m^2$ or less, more preferably, 0.1 $g/m^2$ or more, but 3 $g/m^2$ or less, per surface. When the water-soluble polymer and the papermaking additive of the present invention are mixed and coated together, the preferred amount of water-soluble polymer is about 0.05 to 5 $g/m^2$ per both surfaces, and the preferred amount of cellulose nanofibers is 0.01 to 1 $g/m^2$ per both surfaces.

Further in the present invention, to improve the quality of print, it is possible to apply a coating layer containing pigments on the paper which has been internally or externally provided with the papermaking additive of the present invention to make a printing paper. In addition, with the proviso that a desired effect is obtained, calendaring may be performed. Calendering may be carried out with a commonly used linear pressure, but it is preferred that low linear pressure which can ensure smoothness of paper is used in order to increase a bulking property of the paper. A soft nip calendar is preferably used.

The papermaking additive comprising cellulose nanofibers of the present invention can give a printing paper high smoothness and enhance a quality of printing.

For example, a news printing paper is a kind of printing paper, and is made from 100% recycled pulp, or a mixture of recycled pulp with a mechanical pulp prepared by grinding wood and containing little amount of needle bleached pulp. Alternatively, the news printing paper is prepared by mixing the foregoing various pulps. The news printing paper is required to be hardly cut upon high-speed rotary printing, have high smoothness in both sides, high opacity, and high printing abilities. The papermaking additive of the present invention can remarkably increase the air resistance of news printing paper, and prevent the ink from excessively penetrating into the paper to prevent decrease in density of printing. In particular, if a mixture of the papermaking additive of the present invention with a water-soluble polymer is coated on the paper, cellulose nanofibers fills depressed area of the paper, the smoothness of the paper increases, and adherability of ink on the paper also increases. Also, since the cellulose nanofibers remain on the surface of the paper, the air resistance of the paper increases and, upon printing, excess penetration of ink is prevented and properties of preventing print-through is enhanced.

The papermaking additive of the present invention can also applies to a high-quality printing paper (a wood-free paper) which is made from 100% chemical pulp prepared by subjecting wood to a chemical treatment to remove lignin and consisting of cellulose and hemi-cellulose, a medium-quality printing paper (a wood containing paper) which is made from 40 to 100% of chemical pulp. Various properties of the paper may be determined depending on its use. For example, the basis weight of news printing paper is about 30 to 60 g/m$^2$. A type of printing is not limited, and any type of printing such as offset printing, gravure printing, and anastatic printing may be used. As a type of offset printing, a heat-set type of printing which includes a step of heat drying, and a cold-set type of printing which does not include heat drying, but uses an ink which is dried by penetration of the ink, may be used.

(Electrophotographic Transfer Paper, Thermal Recording Paper, Converting Paper, Paperboard, Sanitary Paper, Inkjet Recording Paper, and the Like)

The paper of the present invention can be used not only as printing paper and news printing paper, but also as electrophotographic transfer paper, inkjet recording paper, thermal recording paper, pressure sensitive recording paper, business form, converting paper, and sanitary paper. In further detail, the converting paper may be an industrial laminates base, backing paper for wall paper, or base paper for molding purposes. The sanitary paper is, in further detail, tissue paper, toilet paper, or a paper towel. The paper of the present invention can also be used as a paperboard such as a corrugating medium.

The papermaking additive of the present invention can increase smoothness and air resistance of electrophotographic transfer paper, and thereby, transferability of toner to paper is improved and quality of printing is heightened.

The papermaking additive of the present invention can increase smoothness and air resistance of inkjet recording paper, prevent an ink from excessively penetrating, avoid breeding of ink, increase fixing of ink, and heighten density of printing.

The papermaking additive of the present invention can increase smoothness and air resistance of thermal recording paper, prevent a thermal sensitive coating from excessively penetrating into the base paper, help the coating to spread on the surface of the paper uniformly, and increase thermal insulation properties and sensitivity of the paper.

The papermaking additive of the present invention can increase smoothness and air resistance of pressure sensitive recording paper, prevent a pressure sensitive coating from excessively penetrating into the base paper, help the coating to spread on the surface of the paper uniformly, and increase sensitivity of the paper.

The papermaking additive of the present invention can increase smoothness and air resistance of backing paper for wall paper, prevent a binder such as aquatic starch paste from excessively penetrating into the base paper, avoid fuzz of the surface of the base paper, and prevent projection of resin surface.

The papermaking additive of the present invention can increase smoothness and air resistance of sanitary paper and make the surface of paper lubricant.

The papermaking additive of the present invention can increase smoothness and air resistance of paperboard such as a corrugated paperboard, and increase the printability of the paper.

(Base Paper for Coated Paper)

Further, the paper of the present invention which contains cellulose nanofibers can be used as base paper for paper having a pigment-containing coating layer such as coated paper, inkjet recording paper, thermal recording paper, pressure sensitive recording paper, or converting paper. In further detail, the coated paper may be art paper, coat paper, lightweight coated paper, cast coated paper, or a white lined board. In further detail, the converting paper may be packaging paper, moisture-proof paper, backing paper for wall paper, base paper for a paper container, or base paper for molding purposes. In particular, paper having the papermaking additive, which comprises the cellulose nanofibers according to the present invention, externally added to paper is markedly improved in air resistance and smoothness, and when this paper is used as base paper and coated with a paint, permeation of the paint is suppressed, and a smooth coating layer is obtained. Thus, coated paper with satisfactory printability can be obtained. For example, base paper for coated paper such as wood-free paper (100% chemical pulp) and wood-containing paper (mixture of chemical pulp and mechanical pulp) may be externally applied the cellulose nanofiber of the present invention, and the resulting base paper has an improved smoothness and air resistance. In such paper, a coating color consisting of pigment such as kaolin and calcium carbonate and a binder such as starch and latex is prevented from excessively penetrating into the base paper, and thus, the coated layer has a high smoothness. Such paper has a high degree of brilliance and high printability, even when the coated amount of coating color is low.

The above paper is also preferably used as base paper for inkjet recording paper, thermal recording paper, or pressure sensitive recording paper, since such papers have a smooth inkjet recording layer, a smooth thermal recording layer, or a smooth pressure sensitive recording layer. Also, the paper of the present invention which comprises cellulose nanofibers may be used as base paper for laminated paper having one or more synthetic resin layers on one surface or both surfaces thereof.

The coated paper of the present invention is paper formed by providing base paper, which contains cellulose nanofibers, with a coating layer having a pigment and a binder. The pigment used in the coating layer is an inorganic pigment such as kaolin, clay, delaminated clay, heavy calcium carbonate, light calcium carbonate, talc, titanium dioxide, barium sulfate, calcium sulfate, zinc oxide, silicic acid, silicate, colloidal silica, or satin white, or an organic pigment such as plastic pigment, which has been used so far for coated paper. Any one or more of these pigments can be selected and used, as appropriate, according to needs.

The binder used in the coating layer is any of those so far used for coated paper, including synthetic adhesives such as various copolymers, for example, a styrene-butadiene copolymer, a styrene-acrylic copolymer, an ethylene-vinyl acetate copolymer, a butadiene-methyl methacrylate copolymer, and a vinyl acetate-butyl acrylate copolymer, polyvinyl alcohol, a maleic anhydride copolymer, and an acrylic acid-methyl methacrylate copolymer; proteins such as casein, soybean protein, and synthetic protein; starches such as oxidized starch, cationic starch, urea phosphoric esterified starch, etherified starch, e.g., hydroxyethyl etherified starch, and dextrin; and cellulose derivatives such as carboxymethylcellulose, hydroxyethylcellulose, and hydroxymethylcellulose. One or more of these ordinary additives for coated paper are selected as appropriate, and put to use. Any of these additives is used in an amount of the order of 5 to 50 parts by weight with respect to 100 parts by weight of the pigment. To make surface strength more satisfactory, it is preferred to contain 10 to 25 parts by weight of a copolymer latex such as styrene-butadiene. From the point of view of flexibility, the content of starch is preferably 5 parts by weight or less.

Various auxiliaries to be compounded with ordinary pigments for coated paper, such as dispersing agents, thickening agents, water retaining agents, anti-foaming agents, water resistant additives, and coloring agents, are used appropriately according to needs.

As the coating layer provided on the base paper, a single layer or two or more layers may be provided on one surface or both surfaces of the base paper. The total amount of coating with the coating layer is preferably 5 to 30 g/m$^2$, more preferably 8 to 20 g/m$^2$, per surface. The amount of coating if an undercoating layer is provided is preferably 2 to 8 g/m$^2$.

Upon application of a coating layer consisting essentially of pigment and binder (s) on a base paper, a film transfer roll coater such as a 2-roll size press coater, a gate roll coater, a blade metering size press coater, a rod metering size press coater, or Sym-Sizer; a flooded nip/blade coater, a jet fountain/blade coater, or a short dwell time applicator; a rod metering coater using a grooved rod or a plain rod instead of a blade; or a publicly known coater such as a curtain coater or a die coater. In coating an undercoating solution, the film transfer method using a gate roll coater or the like is preferred in order to impregnate the base paper with this solution moderately.

For the purpose of, for example, improving smoothness and printing quality, it is possible to carry out the surface treatment of the coated paper obtained in the above-described manner. The method of surface treatment can be to use a publicly known surface treatment apparatus such as a supercalender using a cotton roll as an elastic roll, or a soft nip calendar using a synthetic resin roll as an elastic roll.

Actions

The reason why the papermaking additive comprising cellulose nanofibers of the present invention markedly improve smoothness and air resistance of paper remains unclear. However, it is presumed that unlike a water-soluble polymer such as starch, the cellulose nanofibers are in a fibrous form, and can exist in such a crosslinked state as to fill in the voids of pulp fibers on the surface of the paper.

EXAMPLES

The present invention will be described in more detail by the following examples, which in no way limit the present invention.

<Preparation of Cellulose Nanofiber 1>

Powdery cellulose (manufactured by NIPPON PAPER CHEMICALS CO., LTD.; particle size 24 µm) in an amount of 15 g (absolute dry weight) was added to 500 ml of an aqueous solution having 78 mg (0.5 mmol) of TEMPO (a product of Sigma Aldrich) and 755 mg (5 mmol) of sodium bromide dissolved therein, and the mixture was stirred until the powdery cellulose was uniformly dispersed. To the reaction system, 50 ml of an aqueous solution of sodium hypochlorite (available chlorine 5%) was added, and then the mixture was adjusted to pH 10.3 using a 0.5N aqueous solution of hydrochloric acid to initiate an oxidation reaction. During the reaction, the pH within the system lowers, but a 0.5N aqueous solution of sodium hydroxide was successively added to adjust the pH to 10. After the reaction was performed for 2 hours, the oxidized powdery cellulose was separated by a centrifugal operation (6000 rpm, 30 minutes, 20° C.), and thoroughly washed with water to obtain oxidized powdery cellulose. A 2% (w/v) slurry of the oxidized powdery cellulose was treated by a mixer for 15 minutes at 12,000 rpm, and the powdery cellulose slurry was further treated 5 times under a pressure of 140 MPa by an ultrahigh pressure homogenizer, whereby a transparent gel-like dispersion was obtained.

<Preparation of Cellulose Nanofiber 2>

A cellulose nanofiber was obtained in the same manner as the preparation of cellulose nanofiber 1, with the exception that the powdery cellulose slurry was treated 5 times under a pressure of 120 MPa by an ultrahigh pressure homogenizer.

<Preparation of Cellulose Nanofiber 3>

A cellulose nanofiber was obtained in the same manner as the preparation of cellulose nanofiber 1, with the exception that the powdery cellulose slurry was treated 5 times under a pressure of 100 MPa by an ultrahigh pressure homogenizer.

<Preparation of Cellulose Nanofiber 4>

A cellulose nanofiber was obtained in the same manner as the preparation of cellulose nanofiber 1, with the exception that, in the step of the wet process finely grinding, a rotary blade mixer (rim speed: 37 m/s, NISSEI CORPORATION, processing time: 30 minutes) was used instead of the ultrahigh pressure homogenizer.

<Preparation of Cellulose Nanofiber 5>

A cellulose nanofiber was obtained in the same manner as the preparation of cellulose nanofiber 1, with the exception that 4-methoxy TEMPO was used instead of TEMPO.

<Preparation of Cellulose Nanofiber 6>

A cellulose nanofiber was obtained in the same manner as the preparation of cellulose nanofiber 1, with the exception that a bleached, un-beaten sulfite pulp (manufactured by NIPPON PAPER CHEMICALS CO., LTD.) was used instead of the powdery cellulose, and the oxidized sulfite pulp slurry was treated 40 times under a pressure of 140 MPa by the ultrahigh pressure homogenizer.

<Preparation of Cellulose Nanofiber 7

A cellulose nanofiber was obtained in the same manner as the preparation of cellulose nanofiber 5, with the exception that the bleached, un-beaten sulfite pulp (manufactured by NIPPON PAPER CHEMICALS CO., LTD.) was used instead of the powdery cellulose, the oxidized sulfite pulp slurry was treated by the rotary blade mixer for 5 hours.

The B-type (60 rpm, 20° C.) viscosity each of the cellulose nanofibers obtained by the foregoing preparation methods 1 to 7 was measured with the use of VISCOMETER TV-10 (TOKI SANGYO CO, LTD.), and the result is shown in Table 1.

TABLE 1

| | material | catalyst | wet process finely grinding | | cellulose nanofiber B-tipe viscosity (mPa·s) |
|---|---|---|---|---|---|
| | | | disperser | pressure | |
| Preparatiopn 1 | powdery cellulose | TEMPO | ultrahigh pressure homogenizer | 140 MPa (5 times) | 890 |
| Preparatiopn 2 | powdery cellulose | TEMPO | ultrahigh pressure homogenizer | 120 Mpa (5 times) | 984 |
| Preparatiopn 3 | powdery cellulose | TEMPO | ultrahigh pressure homogenizer | 100 Mpa (5 times) | 1264 |
| Preparatiopn 4 | powdery cellulose | TEMPO | rotary blade mixer (30 minutes) | — | 2860 |
| Preparatiopn 5 | powdery cellulose | 4-methoxy TEMPO | ultrahigh pressure homogenizer | 140 MPa (5 times) | 850 |
| Preparatiopn 6 | sulfite pulp | TEMPO | ultrahigh pressure homogenizer | 140 MPa (40 times) | 5568 |
| Preparatiopn 7 | sulfite pulp | TEMPO | rotary blade mixer (5 hours) | — | 6850 |

By the preparation methods 1 to 7, cellulose nanofibers having a B-type viscosity (60 rpm, 20° C.) of 500 to 7000 mPa·s at a concentration of 2% (w/v) as an aqueous dispersion were obtained. Among them, the cellulose nanofibers obtained by the preparation methods 1 to 3, and 5 have a B-type viscosity (60 rpm, 20° C.) of 500 to 2000 mPa·s at a concentration of 2% (w/v) as an aqueous dispersion, have good flowability, and were easy to coat on a substrate such as paper. The cellulose nanofibers obtained by the preparation methods 4, 6, and 7 have a little high viscosity, and, when the nanofibers were applied on paper, penetration of the nanofibers into paper was suppressed, whereby amount of coating was decreased as compared to the case where the cellulose nanofibers obtained by the preparation methods 1 to 3, and 5, were coated on the same condition.

Next, examples of method for preparing cellulose nanofibers-containing paper by coating the cellulose nanofibers obtained by the foregoing methods on paper.

<Preparation of Wood-Free Paper Containing Cellulose Nanofibers (CNF)>

Example 1

The cellulose nanofiber dispersion obtained by the foregoing preparation method 1 was coated on wood-free paper (paper having 100% chemical pulp, manufactured by Nippon Paper Industries Co., Ltd.; basis weight 79 g/m$^2$) by a 2-roll size press apparatus so that the amount of coating would be 1.4 g/m$^2$ on both surfaces.

Comparative Example 1

The wood-free paper used in Example 1 was coated with water alone by a 2-roll size press apparatus.

Comparative Example 2

The wood-free paper used in Example 1 was coated with an aqueous solution of oxidized starch (commercial name: SK200, manufactured by Nihon Cornstarch Corporation) by a 2-roll size press apparatus so that the amount of coating would be 1.4 g/m$^2$ on both surfaces.

Comparative Example 3

The wood-free paper used in Example 1 was coated with an aqueous solution of polyacrylamide (commercial name: DS4340, manufactured by SEIKO PMC CORPORATION) by a 2-roll size press apparatus so that the amount of coating would be 1.4 g/m$^2$ on both surfaces.

The thicknesses and basis weights of the papers prepared in Example 1 and Comparative Examples 1 to 3 were measured by the methods described below, and the densities were calculated based on the measured values. Further, the breaking length, Taber stiffness, whiteness, opacity, specific scattering coefficient, smoothness, and air resistance of each paper were measured by the methods described below. The results are shown in Table 2.

Thickness: Measured in accordance with JIS P8118:1998.
Basis weight: Measured in accordance with JIS P8124:1998 (ISO 536:1995).
Density: Calculated from the measured values of the thickness and basis weight of the coated sheet.
Breaking length: Measured in accordance with JIS P8113:1998.
Taber stiffness: Measured in accordance with JIS P8125:1976 (ISO 2493:1992).
Whiteness: ISO whiteness was measured in accordance with JIS P8148:2001.
Opacity: Measured in accordance with JIS P8149:2000.
Specific scattering coefficient: Measured with a color-difference meter (manufactured by MURAKAMI COLOR RESEARCH LABORATORY CO., LTD.) in accordance with TAPPI T425 om-91.
Smoothness and air resistance: Measured with an Oken type smoothness/air resistance tester in accordance with Japan TAPPI Paper Pulp Testing Method No. 5-2:2000.

TABLE 2

| | density (g/cm$^3$) | breaking length (km) | Taber stiffness (mN) | whiteness (%) | opacity (%) | specific scattering coefficient (m$^2$/kg) | smoothness (sec.) | air resistance (sec.) |
|---|---|---|---|---|---|---|---|---|
| Example 1 | 0.57 | 2.97 | 0.64 | 73.5 | 95.2 | 86.1 | 43 | 49 |
| Comparative Example 1 | 0.56 | 2.55 | 0.54 | 73.2 | 95.1 | 86.2 | 27 | 6 |

TABLE 2-continued

|  | density (g/cm³) | breaking length (km) | Taber stiffness (mN) | whiteness (%) | opacity (%) | specific scattering coefficient (m²/kg) | smoothness (sec.) | air resistance (sec.) |
|---|---|---|---|---|---|---|---|---|
| Comparative Example 2 | 0.57 | 3.01 | 0.61 | 72.9 | 95 | 83.6 | 30 | 7 |
| Comparative Example 3 | 0.57 | 3.55 | 0.67 | 72.7 | 94.9 | 82.3 | 31 | 9 |

As shown in Table 2, the paper coated with the cellulose nanofibers according to the present invention markedly improved in smoothness and air resistance as compared with the papers coated with oxidized starch or polyacrylamide.

<Preparation of News Printing Paper Containing CNF>

Example 2

News printing paper (manufactured by Nippon Paper Industries Co., Ltd.; basis weight 42 g/m², made from a little amount of mechanical pulp which contains a needle bleached pulp and a major amount of recycled pulp) was coated with the aforementioned cellulose nanofiber dispersion by a 2-roll size press apparatus, with the amount of coating being varied.

Comparative Example 4

The news printing paper used in Example 2 was coated with water alone by a 2-roll size press apparatus.

Comparative Example 5

The news printing paper used in Example 2 was coated with an aqueous solution of oxidized starch (commercial name: SK200, manufactured by Nihon Cornstarch Corporation) by a 2-roll size press apparatus, with the amount of coating being varied.

Comparative Example 6

The news printing paper used in Example 2 was coated with an aqueous solution of polyvinyl alcohol (commercial name: PVA117, manufactured by KURARAY CO., LTD.) by a 2-roll size press apparatus, with the amount of coating being varied.

Figure 2:
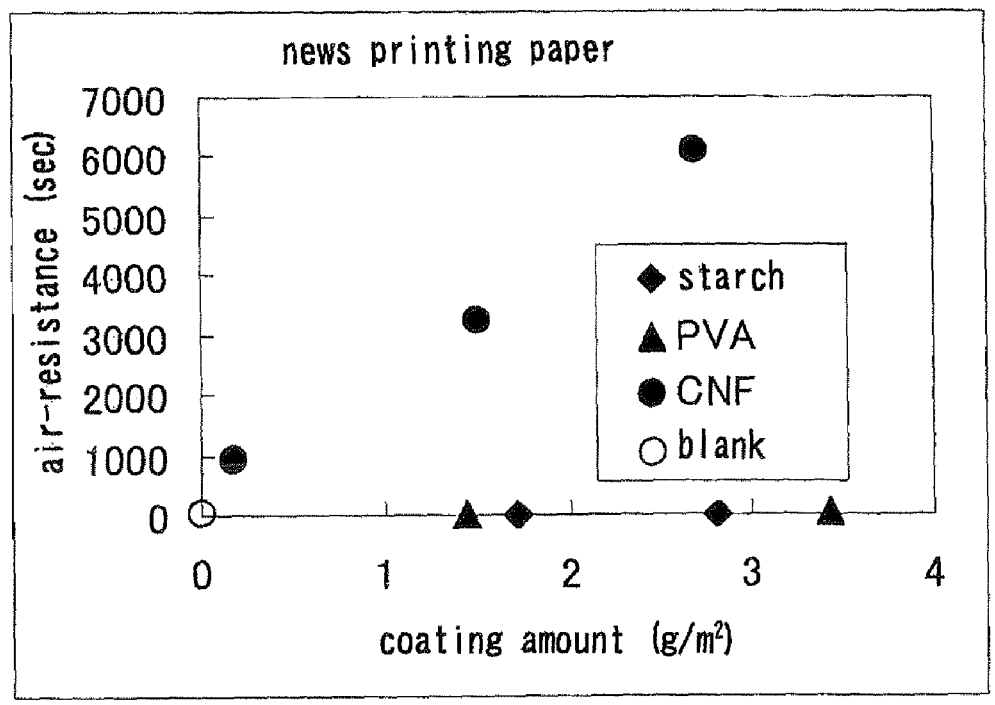
FIG. 2 is a graph showing the results of measurements of the air resistances of the news printing papers prepared in Example 2 (CNF), Comparative Example 4 (blank), Comparative Example 5 (starch), and Comparative Example 6 (PVA).

The papers prepared in Example 2 (CNF), Comparative Example 4 (blank), Comparative Example 5 (starch), and Comparative Example 6 (PVA) were measured for smoothness and air resistance. The results are shown in FIGS. 1 and 2.

<Preparation of Base Paper for Coated Paper Containing CNF>

Example 3

A coat base paper (manufactured by Nippon Paper Industries Co., Ltd.; basis weight 70 g/m², wood-containing paper made from chemical and mechanical pulps) was coated with the aforementioned cellulose nanofiber dispersion by a 2-roll size press apparatus, with the amount of coating being varied.

Comparative Example 7

The coat base paper used in Example 3 was coated with water alone by a 2-roll size press apparatus.

Comparative Example 8

The coat base paper used in Example 3 was coated with an aqueous solution of oxidized starch (commercial name: SK200, manufactured by Nihon Cornstarch Corporation) by a 2-roll size press apparatus, with the amount of coating being varied.

Comparative Example 9

The coat base paper used in Example 3 was coated with an aqueous solution of polyvinyl alcohol (commercial name: PVA117, manufactured by KURARAY CO., LTD.) by a 2-roll size press apparatus, with the amount of coating being varied.

Comparative Example 10

The coat base paper used in Example 3 was coated with an aqueous solution of carboxymethylcellulose (commercial name: F01MC, manufactured by NIPPON PAPER CHEMICALS CO., LTD.) by a 2-roll size press apparatus, with the amount of coating being varied.

Figure 3:
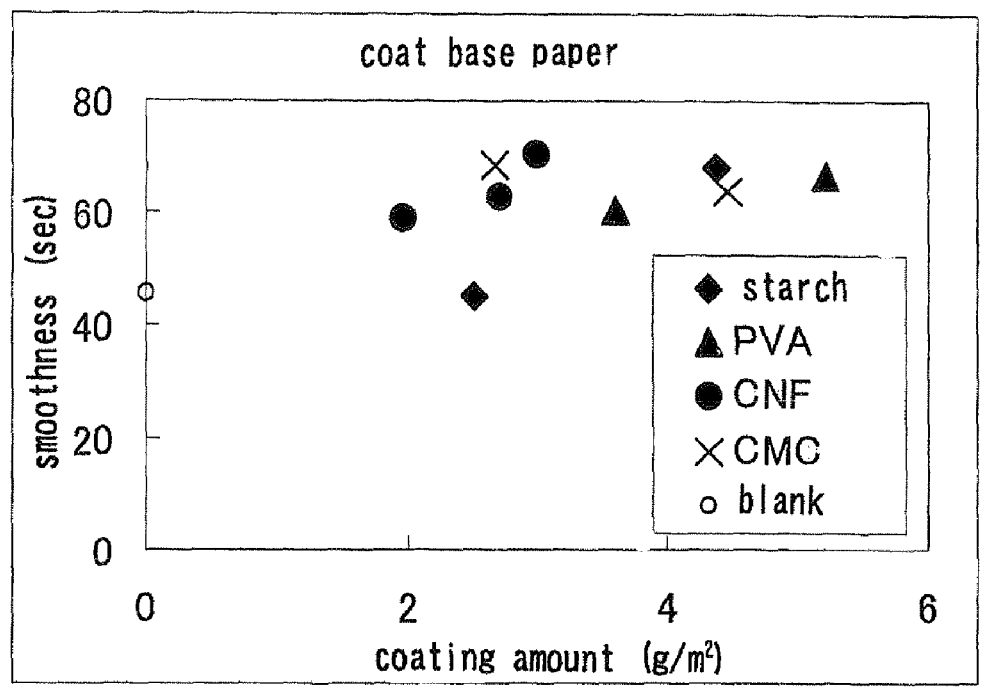
FIG. 3 is a graph showing the results of measurements of the smoothnesses of base papers for coated paper prepared in Example 3 (CNF), Comparative Example 7 (blank), Comparative Example 8 (starch), Comparative Example 9 (PVA), and Comparative Example 10 (CMC).
Figure 4:
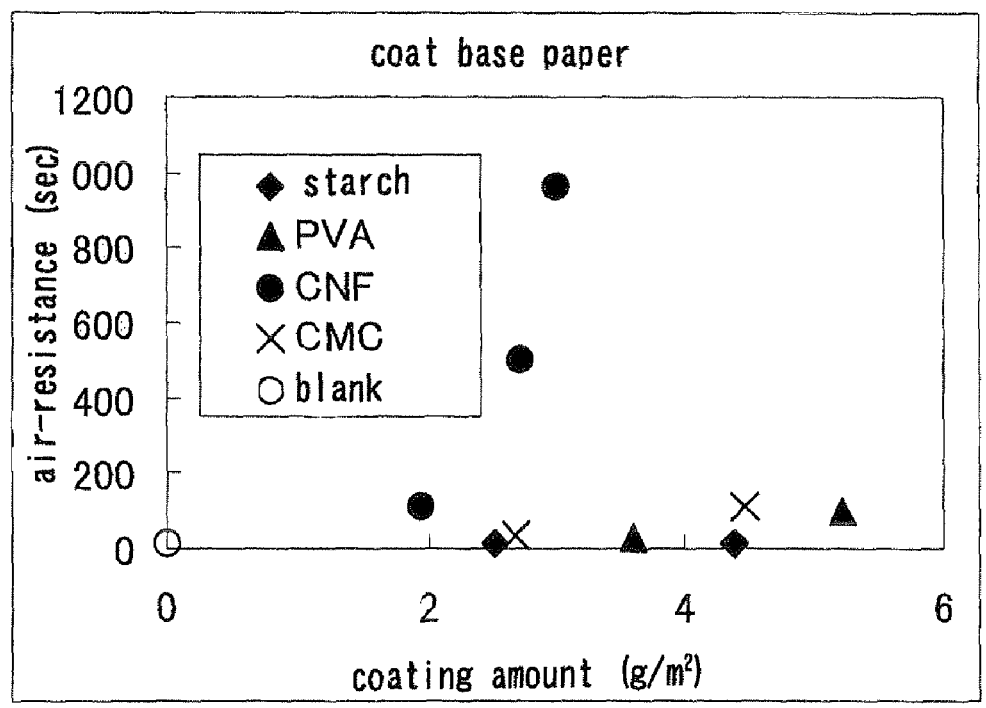
FIG. 4 is a graph showing the results of measurements of the air resistances of the base papers for coated paper prepared in Example 3 (CNF), Comparative Example 7 (blank), Comparative Example 8 (starch), Comparative Example 9 (PVA), and Comparative Example 10 (CMC).

The papers prepared in Example 3 (CNF), Comparative Example 7 (blank), Comparative Example 8 (starch), Comparative Example 9 (PVA), and Comparative Example 10 (CMC) were measured for smoothness and air resistance. The results are shown in FIGS. 3 and 4.

<Preparation of Backing Paper for Wall Paper Containing CNF>

Example 4

Base paper for wall paper (manufactured by Nippon Paper Industries Co., Ltd.; basis weight 64 g/m²) was coated with the aforementioned cellulose nanofiber dispersion by a 2-roll size press apparatus, with the amount of coating being varied.

Comparative Example 11

The base paper for wall paper used in Example 4 was coated with water alone by a 2-roll size press apparatus.

Comparative Example 12

The base paper for wallpaper used in Example 4 was coated with an aqueous solution of oxidized starch (commercial name: SK200, manufactured by Nihon Cornstarch Corporation) by a 2-roll size press apparatus, with the amount of coating being varied.

Comparative Example 13

The base paper for wall paper used in Example 4 was coated with an aqueous solution of polyvinyl alcohol (commercial name: PVA117, manufactured by KURARAY CO., LTD.) by a 2-roll size press apparatus, with the amount of coating being varied.

Figure 5:
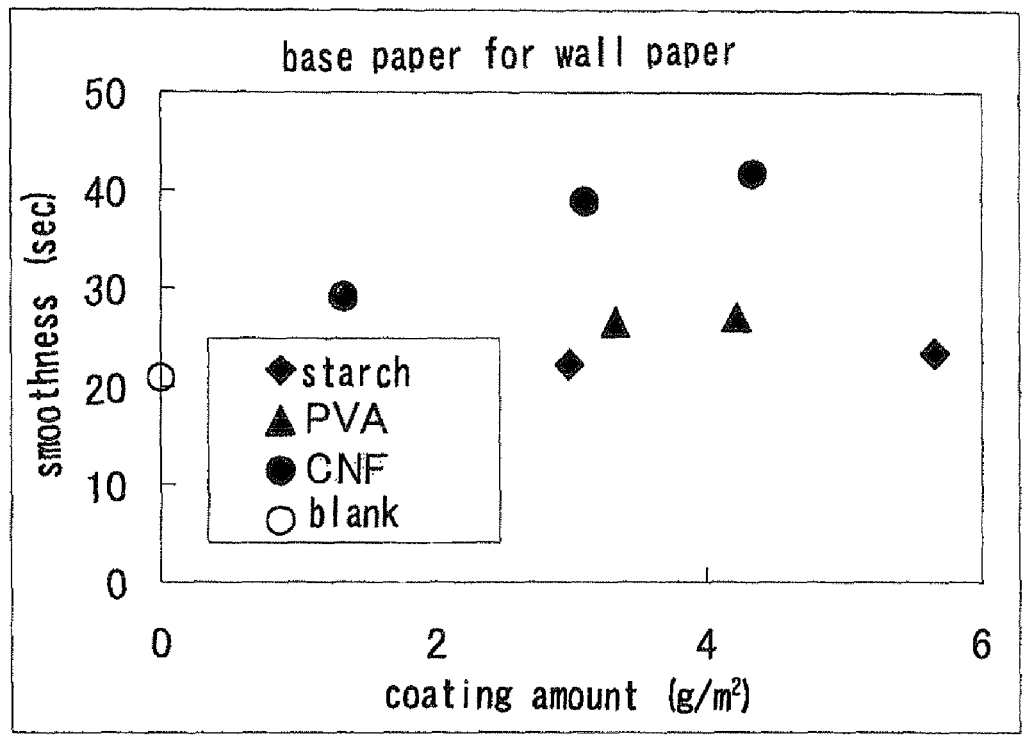
FIG. 5 is a graph showing the results of measurements of the smoothnesses of base papers for wallpaper prepared in Example 4 (CNF), Comparative Example 11 (blank), Comparative Example 12 (starch), and Comparative Example 13 (PVA).

The papers prepared in Example 4 (CNF), Comparative Example 11 (blank), Comparative Example 12 (starch), and Comparative Example 13 (PVA) were measured for smoothness and air resistance. The results are shown in FIGS. 5 and 6.

Figure 6:
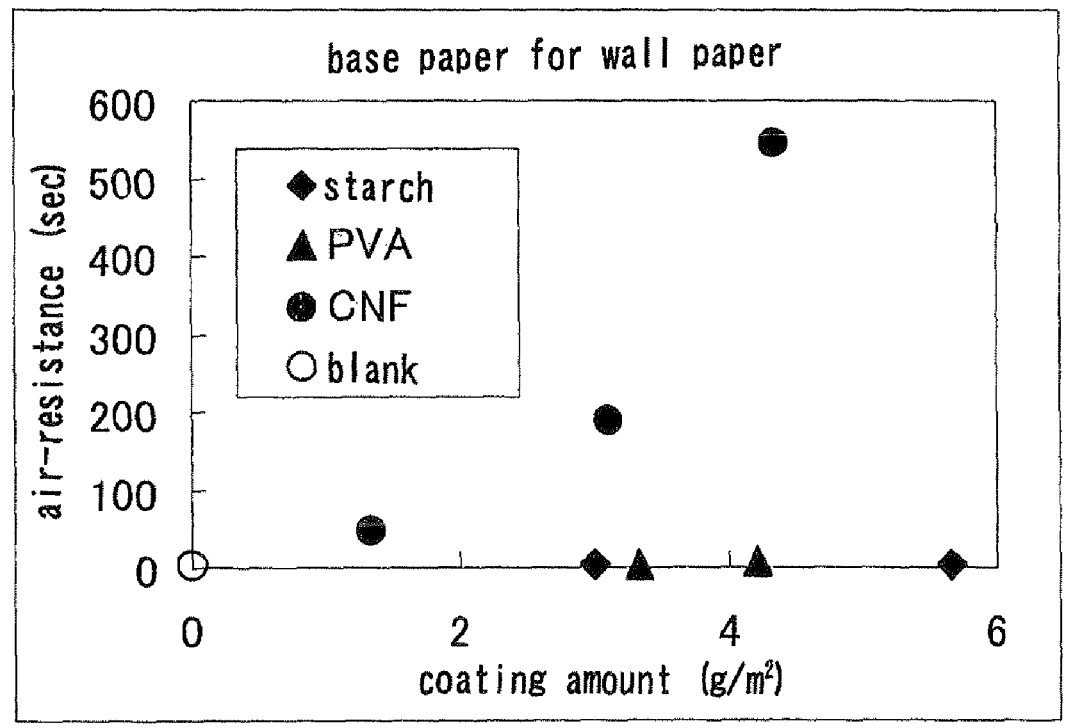
FIG. 6 is a graph showing the results of measurements of the air resistances of the base papers for wallpaper prepared in Example 4 (CNF), Comparative Example 11 (blank), Comparative Example 12 (starch), and Comparative Example 13 (PVA).

As shown in FIGS. 2, 4 and 6, the coating with the cellulose nanofibers of the present invention markedly improved air resistance, compared with the coating with oxidized starch, polyvinyl alcohol, or carboxymethylcellulose, regardless of the type of paper coated (news printing paper, coat base paper, base paper for wall paper). Thereby, in the case of the news printing paper, decrease in density of printing was prevented and quality of printing was improved; in the case of base paper for a coated paper, excessive penetration of a coated material was prevented and the printability was improved; and in the case of base paper for wall paper, excessive penetration of binders was prevented and workability of the wall paper was improved. Further, as shown in FIG. 5, the base paper for wall paper coated with the cellulose nanofibers of the present invention has a high smoothness, as compared with the base paper for wall paper coated with the other compounds. Thereby, fuzz of the base paper for wall paper was suppressed, and a wall paper having a smooth surface was obtained.

<Preparation of Base Paper for Coated Paper Containing CNF>

Example 5

Figure 7:
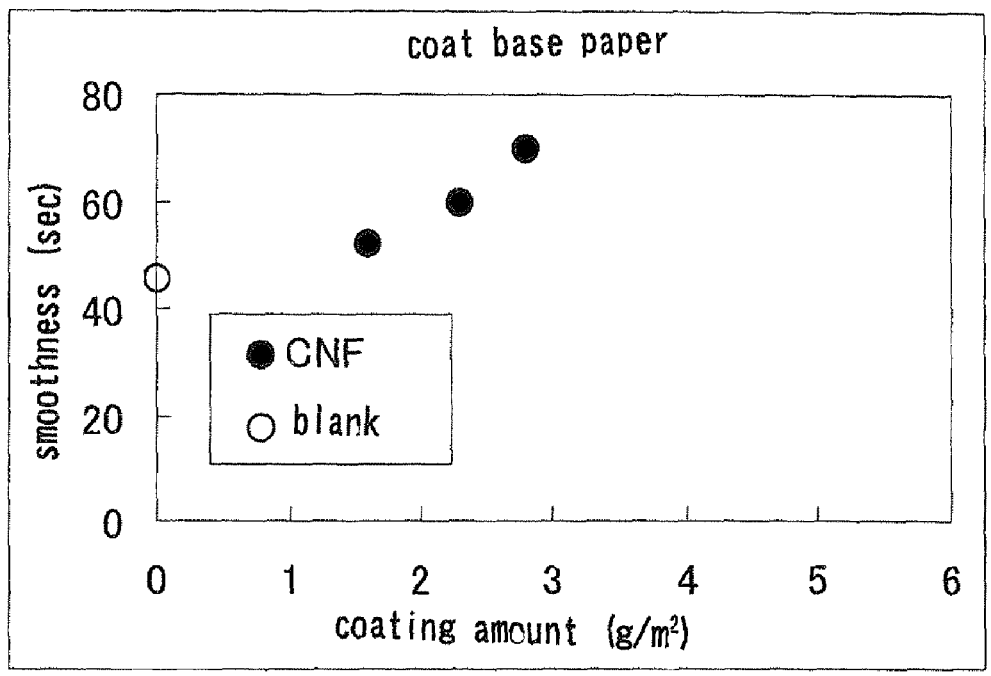
FIG. 7 is a graph showing the results of measurement of smoothness of the base papers for coated paper prepared in Example 5 and Comparative Example 7 (blank).
Figure 8:
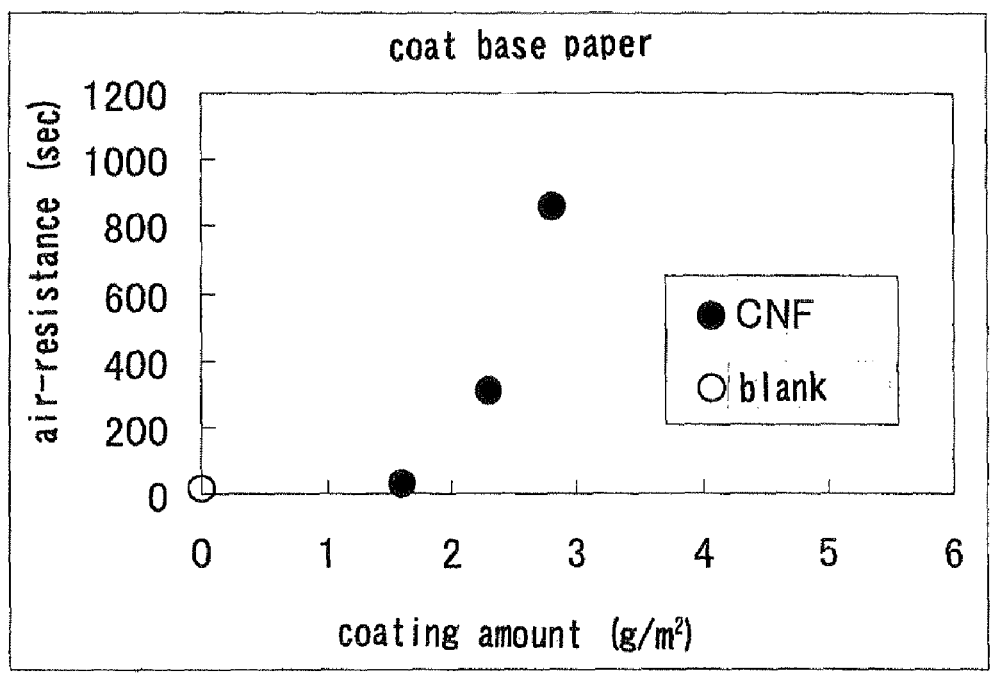
FIG. 8 is a graph showing the results of measurement of air resistance of the base papers for coated paper prepared in Example 5 and Comparative Example 7 (blank).

The coat base paper used in Example 3 was with the cellulose nanofiber dispersion obtained by the foregoing preparation method 3 by a 2-roll size press apparatus, with the amount of coating being varied. The smoothness and air resistance of the resulting paper were measured, and the results are shown in FIGS. 7 and 8.

<Preparation of Thermal Recording Paper of which Base Paper Contains CNF>

Example 6

A thermal sensitive coating color having the following composition was coated on the paper obtained by Example 1 which has been coated with the cellulose nanofibers, by a Meyer bar so that the amount of coating would be 6 g/m², and then the resulting paper was dried and calendered so that the Oken type smoothness would be 500 seconds, to obtain a thermal recording paper having a thermal sensitive layer.

| Composition of the thermal sensitive layer: | |
|---|---|
| Dispersion of color developer (dispersion A) | 36.0 parts |
| Dispersion of leuco dye (dispersion B) | 13.8 parts |
| Dispersion of sensitizer (dispersion C) | 36.0 parts |
| 10% of aqueous solution of absolutely saponified polyvinyl alcohol (commercial name: PVA117, manufactured by KURARAY CO., LTD.) | 25.0 parts |

Compositions of each of the dispersions of color developer (dispersion A), leuco dye (dispersion B), and sensitizer (dispersion C) are as follows, and the dispersions were prepared separately by wet-grinding with a sand grinder so that their average particle size would be 0.5 micron.

| Dispersion A (dispersion of color developer) | |
|---|---|
| 4-hydroxy-4'-isopropoxy-diphenylsulfone | 6.0 parts |
| 10% of aqueous solution of polyvinyl alcohol | 18.8 parts |
| water | 11.2 parts |
| Dispersion B (dispersion of basic and colorless dye) | |
| 3-dibutylamino-6-methyl-7-anilinofluorane (ODB-2) | 3.0 parts |
| 10% of aqueous solution of polyvinyl alcohol | 6.9 parts |
| water | 3.9 parts |
| Dispersion C (dispersion of sensitizer) | |
| dibenzyl oxalate | 6.0 parts |
| 10% of aqueous solution of polyvinyl alcohol | 18.8 parts |
| water | 11.2 parts |

Comparative Example 14

A thermal recording paper was prepared in the same manner as Example 6, with the exception that the thermal sensitive coating color was coated on the paper obtained by Example 3 which has been coated with water alone.

The sensitivity of the papers prepared in Example 6 and Comparative Example 14 were measured in the manner described below. The results are shown in Table 3.

Sensitivity: Printing was performed with a TH-PMD (manufactured by OHKURA DENKI CORPORATION, a tester for thermal recording paper equipped with a thermal head manufactured by KYOCERA CORPORATION) under the applied energy of 0.41 mJ/dot. Density of printing was measured with a Macbeth densitometer (RD-914, equipped with an amber filter).

TABLE 3

| | sensitivity |
|---|---|
| Example 6 | 1.39 |
| Comparative Example 14 | 1.21 |

As shown in Table 3, the thermal recording paper using base paper coated with the cellulose nanofiber of the present invention (Example 6) has an markedly improved sensitivity, as compared with the thermal recording paper using base paper coated with water. The reason for this is considered that smoothness and air resistance of the base paper coated with the cellulose nanofiber (Example 1) is much higher than the base paper coated with water (Comparative Example 1), and therefore, in the case of thermal recording paper (Example 6) which uses the base paper coated with the cellulose nanofiber, excessive penetration of the thermal sensitive coating color into the base paper is suppressed, and the thermal sensitive coating color is coated uniformly on the base paper to provide thermal insulation effect with the paper and the sensitivity is improved.

<Preparation of a Wood-Free, Off-Set Printing Paper Containing CNF>

Example 7

100 parts of leaf bleached kraft pulp (LBKP, freeness: 400 ml) was defiberized to prepare a pulp slurry. To the pulp slurry, calcium carbonate was added in an amount of 5.0% based on the absolutely dried pulp. Neutral papermaking was carried out with a twin-wire paper machine so that the basis weight would be 62 g/m² to obtain a wood free base paper. The ash content of the resulting base paper was 9.5%.

To the base paper, a coating material containing hydroxyethylated starch and the cellulose nanofiber prepared in the preparation method 1 in an amount (solid content) shown in Table 4 was coated by a 2-roll size press apparatus so that the coating amount (solid content) of starch and the cellulose nanofiber would be 2.0 g/m² and 0.1 g/m², respectively (both surfaces), to obtain a wood-free offset printing paper.

Comparative Example 15

The base paper used in Example 7 was coated with water alone by a 2-roll size press apparatus.

Comparative Example 16

The base paper used in Example 7 was coated with an aqueous solution of hydroxyethlated starch by a 2-roll size press apparatus so that the coating amount of the starch would be 2.0 g/m² on both surfaces.

Comparative Example 17

The base paper used in Example 7 was coated with an aqueous solution of polyacrylamide (commercial name: DS4340, manufactured by SEIKO PMC CORPORATION) by a 2-roll size press apparatus so that the coating amount of the polyacrylamide would be 2.0 g/m² on both surfaces.

Test

The thickness and basis weights of the papers prepared in Example 7 and Comparative Examples 15 to 17 were measured by the methods described below, and the densities were calculated based on the measured values. Further, the smoothness, air resistance, adherability of ink, and print through were measured by the methods described below. The results are shown in Table 4.

<Measurement of Basis Weight, Thickness and Density>
Basis weight: Measured in accordance with JIS P8124:1998 (ISO 536:1995).
Thickness: Measured in accordance with JIS P 8118:1998.
Density: Calculated from the measured values of the thickness and basis weight of the coated sheet.

<Measurement of Smoothness and Air Resistance>
The smoothness and air resistance were measured with an Oken type smoothness/air resistance tester in accordance with Japan TAPPI Paper Pulp Testing Method No. 5-2:2000.

<Test for RI Printing—Adherability of Ink>
Printing was carried out with an offset eco-ink, high viscosity AF ink manufactured by TOYO INK MFG. CO., LTD, by an RI printer (4-color printer) manufactured by ISHIKAWAJIMA INDUSTRIAL MACHINERY CO., LTD.

Adherability of ink (unevenness in printing) was evaluated by visual observation in accordance with the following basis:
◎: Highly even printing is obtained.
○: Even printing is obtained.
Δ: Printing is uneven.
X: Printing is markedly uneven.

<Test for RI Printing—Print Through>
Printing was carried out with an offset eco-ink, high viscosity AF ink manufactured by TOYO INK MFG. CO., LTD, by an RI printer (4-color printer) manufactured by ISHIKAWAJIMA INDUSTRIAL MACHINERY CO., LTD. The level of print through was evaluated by visual observation in accordance with the following basis:
◎: Penetration of ink to the back side of the printing is not observed.
○: Penetration of ink to the back side of the printing is almost not observed.
Δ: Penetration of ink to the back side of the printing is a little observed.
X: Penetration of ink to the back side of the printing is observed.

TABLE 4

| | composition of coating material | | | | coating amount (both surfaces) | | | | | | RI printing test | |
|---|---|---|---|---|---|---|---|---|---|---|---|---|
| | starch % | polyacrylamide % | CNF % | solid content % | starch g/m² | polyacrylamide g/m² | CNF g/m² | density g/cm³ | smoothness sec | air resistance sec | adherability of ink visual observation | print through visual observation |
| Example 7 | 9.5 | 0 | 0.5 | 10.0 | 2.0 | 0 | 0.10 | 0.604 | 22 | 92 | ◎ | ◎ |
| Comparative Example 15 | 0 | 0 | 0 | 0 | 0 | 0 | 0 | 0.594 | 11 | 8 | X | X |
| Comparative Example 16 | 10.0 | 0 | 0 | 10.0 | 2.0 | 0 | 0 | 0.600 | 13 | 12 | Δ | Δ |
| Comparative Example 17 | 0 | 10.0 | 0 | 10.0 | 0 | 2.0 | 0 | 0.601 | 15 | 14 | Δ | Δ |

As shown in Table 4, the paper coated with a mixture of the cellulose nanofiber of the present invention and the starch has a higher smoothness and air resistance than those of the papers coated with starch alone or polyacrylamide, and has a good adherability of ink and prevention of print through, while the density is not increased.

<Preparation of a Wood-Containing, Offset Printing Paper Containing CNF>

Example 8

95 parts of thermomechanical pulp (TMP, freeness: 100 ml) and 5 parts of needle bleached kraft pulp (nBKP, freeness: 600 ml) were mixed and defiberized to prepare a pulp slurry. To the pulp slurry, calcium carbonate was added in an amount of 5.0% based on the absolutely dried pulp. Neutral papermaking was carried out with a twin-wire paper machine so that the basis weight would be 53 g/m² to obtain a wood-containing base paper. The ash content of the resulting base paper was 4.4%.

To the base paper, a coating material containing hydroxyethylated starch and the cellulose nanofiber prepared in the preparation method 1 in an amount (solid content) shown in Table 5 was coated by a 2-roll size press apparatus so that the coating amount (solid content) of starch and the cellulose nanofiber would be 2.0 g/m² and 0.1 g/m², respectively (both surfaces), to obtain a wood-containing offset printing paper.

Comparative Example 18

The base paper used in Example 8 was coated with water alone by a 2-roll size press apparatus.

Comparative Example 19

The base paper used in Example 8 was coated with an aqueous solution of hydroxyethlated starch by a 2-roll size press apparatus so that the coating amount of the starch would be 2.0 g/m² on both surfaces.

Comparative Example 20

The base paper used in Example 8 was coated with an aqueous solution of polyacrylamide (commercial name: DS4340, manufactured by SEIKO PMC CORPORATION) by a 2-roll size press apparatus so that the coating amount of the polyacrylamide would be 2.0 g/m² on both surfaces.
Test
The thickness and basis weights of the papers prepared in Example 8 and Comparative Examples 18 to 20 were measured by the methods described below, and the densities were calculated based on the measured values. Further, the smoothness, air resistance, adherability of ink, and print through were measured by the methods described above. The results are shown in Table 5.

TABLE 5

| | composition of coating material | | | | coating amount (both surfaces) | | | | | | RI printing test | |
|---|---|---|---|---|---|---|---|---|---|---|---|---|
| | starch % | polyacryl- amide % | CNF % | solid content % | starch g/m² | polyacryl- amide g/m² | CNF g/m² | density g/cm³ | smooth- ness sec | air resistance sec | adherability of ink visual observation | print through visual observation |
| Example 8 | 9.5 | 0 | 0.5 | 10.0 | 2.0 | 0 | 0.10 | 0.372 | 15 | 86 | ⊚ | ⊚ |
| Comparative Example 18 | 0 | 0 | 0 | 0 | 0 | 0 | 0 | 0.366 | 7 | 5 | X | X |
| Comparative Example 19 | 10.0 | 0 | 0 | 10.0 | 2.0 | 0 | 0 | 0.373 | 9 | 7 | Δ | Δ |
| Comparative Example 20 | 10.0 | 10.0 | 0 | 10.0 | 2.0 | 2.0 | 0 | 0.369 | 9 | 7 | Δ | Δ |

As shown in Table 5, the paper coated with a mixture of the cellulose nanofiber of the present invention and the starch has a higher smoothness and air resistance than those of the papers coated with starch alone or polyacrylamide, and has a good adherability of ink and prevention of print through, while the density is not increased.

<Preparation of a News Printing Paper>

Example 9

80 parts of deinked pulp (DIP, freeness: 180 ml) and 15 parts of TMP (freeness: 100 ml) and 5 parts of needle bleached kraft pulp (NBKP, freeness: 600 ml) were mixed and defibrated to prepare a pulp slurry. To the pulp slurry, calcium carbonate was added in an amount of 7.5% based on the absolutely dried pulp. Neutral papermaking was carried out with a twin-wire paper machine so that the basis weight would be 42 g/m² to obtain a news printing base paper. The ash content of the resulting base paper was 12.5%.
To the base paper, a coating material containing hydroxyethylated starch and the cellulose nanofiber prepared in the preparation method 1 in an amount (solid content) shown in Table 6 was coated by a 2-roll size press apparatus so that the coating amount (solid content) of starch and the cellulose nanofiber would be 3.0 g/m² and 0.5 g/m², respectively (both surfaces), to obtain an off-set news printing paper.

Example 10

An off-set news printing paper was prepared in the same manner as in Example 9, with the exception that the coating amount of starch and the cellulose nanofiber was changed to 3.0 g/m² and 0.3 g/m², respectively.

Example 11

An off-set news printing paper was prepared in the same manner as in Example 9, with the exception that the coating amount of starch and the cellulose nanofiber was changed to 3.0 g/m² and 0.1 g/m², respectively.

Example 12

An off-set news printing paper was prepared in the same manner as in Example 9, with the exception that the coating amount of starch and the cellulose nanofiber was changed to 3.0 g/m² and 0.05 g/m², respectively.

Example 13

An off-set news printing paper was prepared in the same manner as in Example 9, with the exception that the coating amount of starch and the cellulose nanofiber was changed to 2.0 g/m² and 0.5 g/m², respectively.

Example 14

An off-set news printing paper was prepared in the same manner as in Example 9, with the exception that the coating amount of starch and the cellulose nanofiber was changed to 2.0 g/m² and 0.3 g/m², respectively.

Example 15

An off-set news printing paper was prepared in the same manner as in Example 9, with the exception that the coating amount of starch and the cellulose nanofiber was changed to 2.0 g/m² and 0.1 g/m², respectively.

Example 16

An off-set news printing paper was prepared in the same manner as in Example 9, with the exception that the coating amount of starch and the cellulose nanofiber was changed to 2.0 g/m² and 0.05 g/m², respectively.

Example 17

An off-set news printing paper was prepared in the same manner as in Example 9, with the exception that the coating amount of starch and the cellulose nanofiber was changed to 1.0 g/m² and 0.5 g/m², respectively.

Example 18

An off-set news printing paper was prepared in the same manner as in Example 9, with the exception that the coating amount of starch and the cellulose nanofiber was changed to 1.0 g/m² and 0.3 g/m², respectively.

Example 19

An off-set news printing paper was prepared in the same manner as in Example 9, with the exception that the coating amount of starch and the cellulose nanofiber was changed to 1.0 g/m² and 0.1 g/m², respectively.

Example 20

An off-set news printing paper was prepared in the same manner as in Example 9, with the exception that the coating amount of starch and the cellulose nanofiber was changed to 1.0 g/m² and 0.05 g/m², respectively.

Comparative Example 21

The base paper used in Example 9 was coated with water alone by a 2-roll size press apparatus.

Comparative Example 22

The base paper used in Example 9 was coated with an aqueous solution of hydroxyethlated starch by a 2-roll size press apparatus so that the coating amount of the starch would be 3.0 g/m² on both surfaces.

Comparative Example 23

The base paper used in Example 9 was coated with an aqueous solution of hydroxyethlated starch by a 2-roll size press apparatus so that the coating amount of the starch would be 2.0 g/m² on both surfaces.

Comparative Example 24

The base paper used in Example 9 was coated with an aqueous solution of hydroxyethlated starch by a 2-roll size press apparatus so that the coating amount of the starch would be 1.0 g/m² on both surfaces.

Test

Figure 9:
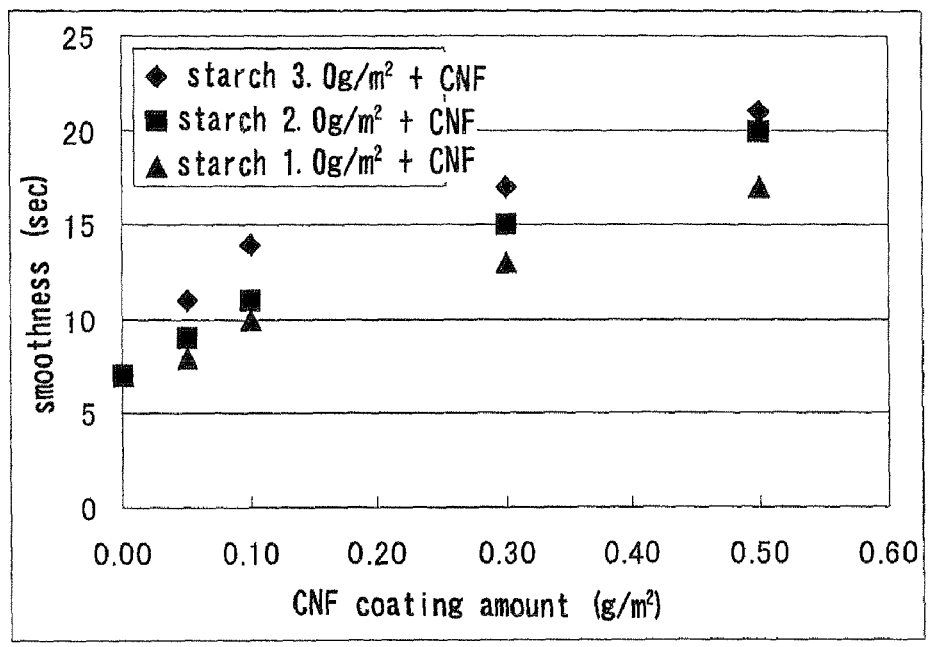
FIG. 9 is a graph showing the results of measurement of smoothness of news printing paper prepared in Examples 9 to 12 and Comparative Example 22 (fixing the coating amount of starch at 3.0 g/m$^2$, and altering the coating amount of CNF), Examples 13 to 16 and Comparative Example 23 (fixing the coating amount of starch at 2.0 g/m$^2$, and altering the coating amount of CNF), as well as Examples 17 to 20 and Comparative Example 24 (fixing the coating amount of starch at 1.0 g/m$^2$, and altering the coating amount of CNF).
Figure 10:
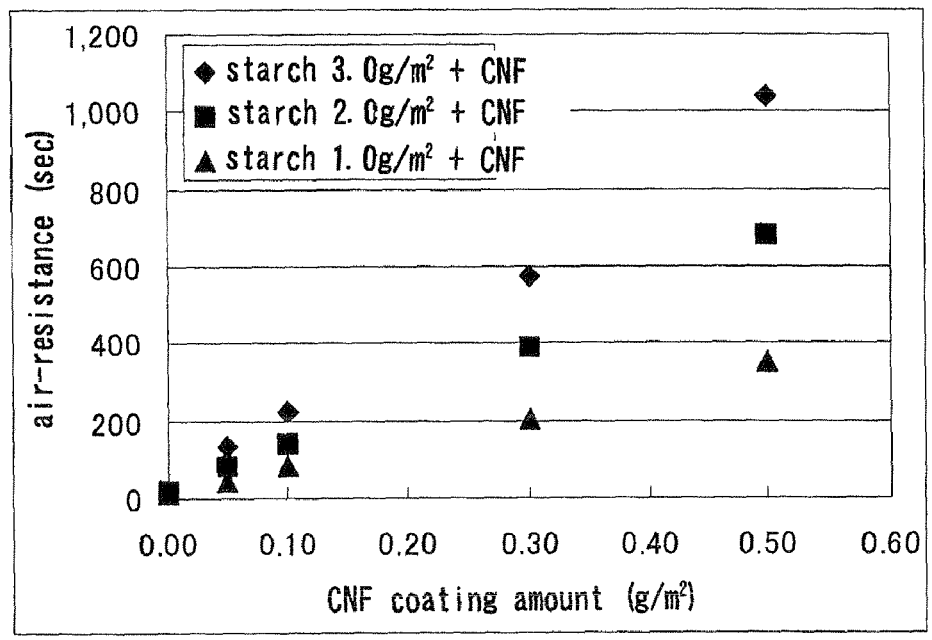
FIG. 10 is a graph showing the results of measurement of air resistance of news printing paper prepared in Examples 9 to 12 and Comparative Example 22 (fixing the coating amount of starch at 3.0 g/m$^2$, and altering the coating amount of CNF), Examples 13 to 16 and Comparative Example 23 (fixing the coating amount of starch at 2.0 g/m$^2$, and altering the coating amount of CNF), as well as Examples 17 to 20 and Comparative Example 24 (fixing the coating amount of starch at 1.0 g/m$^2$, and altering the coating amount of CNF).

The thickness and basis weights of the papers prepared in Examples 9 to 20 and Comparative Examples 21 to 24 were measured by the methods described below, and the densities were calculated based on the measured values. Further, the smoothness, air resistance, adherability of ink, and print through were measured by the methods described above. The results are shown in Table 6, and FIGS. 9 and 10.

TABLE 6

| | composition of coating material | | | coating amount (both surfaces) | | | | | RI printing test | |
|---|---|---|---|---|---|---|---|---|---|---|
| | starch % | CNF % | solid content % | starch g/m2 | CNF g/m² | density g/cm³ | smooth-ness sec | air resistance sec | adherability of ink visual observation | print through visual observation |
| Example 9 | 10.8 | 1.2 | 12.0 | 3.0 | 0.50 | 0.576 | 21 | 1038 | ◉ | ◉ |
| Example 10 | 11.1 | 0.9 | 12.0 | 3.0 | 0.30 | 0.579 | 17 | 573 | ◉ | ◉ |
| Example 11 | 11.5 | 0.5 | 12.0 | 3.0 | 0.10 | 0.571 | 14 | 227 | ◉ | ◉ |
| Example 12 | 11.7 | 0.3 | 12.0 | 3.0 | 0.05 | 0.578 | 11 | 132 | ○ | ◉ |
| Example 13 | 8.8 | 1.2 | 10.0 | 2.0 | 0.50 | 0.574 | 20 | 684 | ◉ | ◉ |
| Example 14 | 9.1 | 0.9 | 10.0 | 2.0 | 0.30 | 0.569 | 15 | 392 | ◉ | ◉ |
| Example 15 | 9.5 | 0.5 | 10.0 | 2.0 | 0.10 | 0.575 | 11 | 141 | ◉ | ◉ |
| Example 16 | 9.7 | 0.3 | 10.0 | 2.0 | 0.05 | 0.580 | 9 | 84 | ○ | ◉ |
| Example 17 | 5.8 | 1.2 | 7.0 | 1.0 | 0.50 | 0.577 | 17 | 348 | ◉ | ◉ |
| Example 18 | 6.1 | 0.9 | 7.0 | 1.0 | 0.30 | 0.576 | 13 | 207 | ◉ | ◉ |
| Example 19 | 6.5 | 0.5 | 7.0 | 1.0 | 0.10 | 0.571 | 10 | 81 | ○ | ◉ |
| Example 20 | 6.7 | 0.3 | 7.0 | 1.0 | 0.05 | 0.581 | 8 | 42 | ○ | ○ |
| Comparative Example 21 | 0 | 0 | 0 | 0 | 0 | 0.576 | 6 | 10 | X | X |
| Comparative Example 22 | 12.0 | 0 | 12.0 | 3.0 | 0 | 0.581 | 7 | 19 | Δ | Δ |
| Comparative Example 23 | 10.0 | 0 | 10.0 | 2.0 | 0 | 0.577 | 7 | 17 | Δ | Δ |
| Comparative Example 24 | 7.0 | 0 | 7.0 | 1.0 | 0 | 0.574 | 7 | 13 | Δ | X |

As shown in Table 6, the paper coated with a mixture of the cellulose nanofiber of the present invention and the starch has a higher smoothness and air resistance than those of the papers coated with starch alone or polyacrylamide, and has a good adherability of ink and prevention of print through, while the density is not increased.

The invention claimed is:

1. A cellulose nanofiber obtained by a method comprising the steps of:

oxidizing a cellulosic material with an oxidizing agent in the presence of:

(1) N-oxyl compound(s), and
(2) compound(s) selected from the group consisting of bromide, iodide and mixtures thereof to prepare an oxidized cellulose; and finely grinding the oxidized cellulose in a wet condition to convert the oxidized cellulose into nanofibers having an amount of carboxyl groups of 1.2 mmol or more, based on 1 g absolute dry weight of the cellulose nanofibers, and whose B-type viscosity (60 rpm, 20° C.) as an aqueous solution at a concentration of 2% (w/v) is from 500 to 7000 mPa·s.

2. The cellulose nanofiber according to claim 1 whose B-type viscosity (60 rpm, 20° C.) as an aqueous solution at a concentration of 2% (w/v) is from 500 to 2000 mPa·s.

3. The cellulose nanofiber according to claim 1 wherein the step of finely grinding comprises defibrating the oxidized cellulose with an ultrahigh pressure homogenizer under a pressure of not less than 100 MPa.

4. A papermaking additive comprising the cellulose nanofiber according to claim 1.

5. Paper containing the cellulose nanofiber according to claim 1.

6. Paper according to claim 5 which is used as a printing paper.

7. A thermal recording paper using the paper according to claim 5 as a base paper.

8. A coated paper using the paper according to claim 5 as a base paper.

9. The paper according to claim 5 which is used as a news printing paper.

10. The paper according to claim 5 which is used as a converting paper.

11. The paper according to claim 5 which is used as an electrophotographic transfer paper.

12. The paper according to claim 5 which is used as a paper board.

13. The paper according to claim 5 which is used as a sanitary paper.

14. The paper according to claim 5 which is used as an inkjet recording paper.

15. The paper according to claim 5 which is used as a thermal recording paper.

16. The paper according to claim 5 which is used as a pressure sensitive recording paper.

17. An inkjet recording paper using the paper according to claim 5 as a base paper.

18. A pressure sensitive recording paper using the paper according to claim 5 as a base paper.

19. A laminated paper having one or more layers of synthetic resin on a surface or both surfaces of the paper according to claim 5 as a base paper.

20. A method for preparing cellulose nanofiber having an amount of carboxyl groups of 1.2 mmol or more, based on 1 g absolute dry weight of the cellulose nanofibers and whose B-type viscosity (60 rpm, 20° C.) as an aqueous solution at a concentration of 2% (w/v) is from 500 to 7000 mPa·s, comprising the steps of:

oxidizing a cellulosic material with an oxidizing agent in the presence of:
(1) N-oxyl compound(s), and
(2) compound(s) selected from the group consisting of bromide, iodide and mixtures thereof to prepare an oxidized cellulose; and finely grinding the oxidized cellulose in a wet condition to convert the oxidized cellulose into nanofibers.

21. The process according to claim 20 wherein the B-type viscosity (60 rpm, 20° C.) of the cellulose nanofiber as an aqueous solution at a concentration of 2% (w/v) is from 500 to 20 mPa·s.

22. The process according to claim 20 wherein the step of finely grinding comprises defibrating the oxidized cellulose with an ultrahigh pressure homogenizer under a pressure of not less than 100 MPa.

\* \* \* \* \*

UNITED STATES PATENT AND TRADEMARK OFFICE
CERTIFICATE OF CORRECTION

| | | |
|---|---|---|
| PATENT NO. | : 8,377,563 B2 | Page 1 of 1 |
| APPLICATION NO. | : 12/922546 | |
| DATED | : February 19, 2013 | |
| INVENTOR(S) | : Miyawaki et al. | |

It is certified that error appears in the above-identified patent and that said Letters Patent is hereby corrected as shown below:

On the Title Page

Item (73) Assignee: Nippon Paper Industruies Co., Ltd., Tokyo (JP)

Should be

Item (73) Assignee: Nippon Paper Industries Co., Ltd., Tokyo (JP)

Signed and Sealed this
Eighteenth Day of June, 2013

Teresa Stanek Rea
*Acting Director of the United States Patent and Trademark Office*